United States Patent
Kim et al.

(10) Patent No.: US 10,448,367 B2
(45) Date of Patent: Oct. 15, 2019

(54) METHOD FOR SUPPORTING FLEXIBLE RESOURCE ALLOCATION IN WIRELESS COMMUNICATION SYSTEM AND DEVICE THEREFOR

(71) Applicant: LG ELECTRONICS INC., Seoul (KR)

(72) Inventors: Jeongki Kim, Seoul (KR); Wookbong Lee, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 15/508,819

(22) PCT Filed: Sep. 4, 2015

(86) PCT No.: PCT/KR2015/009348
§ 371 (c)(1),
(2) Date: Mar. 3, 2017

(87) PCT Pub. No.: WO2016/036188
PCT Pub. Date: Mar. 10, 2016

(65) Prior Publication Data
US 2017/0289962 A1    Oct. 5, 2017

Related U.S. Application Data

(60) Provisional application No. 62/045,575, filed on Sep. 4, 2014.

(51) Int. Cl.
*H04L 5/00* (2006.01)
*H04W 72/04* (2009.01)
(Continued)

(52) U.S. Cl.
CPC .......... *H04W 72/04* (2013.01); *H04B 7/0452* (2013.01); *H04W 72/042* (2013.01);
(Continued)

(58) Field of Classification Search
CPC .... H04B 7/0413; H04B 7/068; H04B 7/0452; H04L 5/0007; H04L 5/0035; H05K 999/99; H04W 72/04; H04W 72/0486
See application file for complete search history.

(56) References Cited

U.S. PATENT DOCUMENTS

2010/0220683 A1 * 9/2010 Novak .................. H04L 5/0044
370/330
2011/0096738 A1    4/2011 Choi
(Continued)

FOREIGN PATENT DOCUMENTS

CN    101911758    12/2010
CN    102726109    10/2012
(Continued)

OTHER PUBLICATIONS

PCT International Application No. PCT/KR2015/009348, Written Opinion of the International Searching Authority dated Jan. 25, 2016, 21 pages.

*Primary Examiner* — Ayaz R Sheikh
*Assistant Examiner* — Debebe A Asefa
(74) *Attorney, Agent, or Firm* — Lee Hong Degerman Kang Waimey

(57) ABSTRACT

The present document is for flexibly resource allocation in a wireless LAN system. To this end, an STA prepares resource allocation information in which data is to be transmitted to a plurality of STAs by using an orthogonal frequency divisional multiple access (OFDMA) scheme or a multiple user MIMO (MU-MIMO) scheme, and transmits the data to the plurality of STAs according to the resource
(Continued)

allocation information. The resource allocation information preferably includes a group ID indicating the plurality of STAs, a resource allocation bitmap having a format in common with the plurality of STAs, resource allocation information for each of the plurality of STAs and resource allocation sequence information indicating a resource allocation order of the STAs in the group.

10 Claims, 12 Drawing Sheets

(51) Int. Cl.
    *H04W 74/04*     (2009.01)
    *H04W 74/08*     (2009.01)
    *H04W 84/12*     (2009.01)
    *H04B 7/0452*     (2017.01)

(52) U.S. Cl.
    CPC .......... *H04W 74/04* (2013.01); *H04L 5/0007* (2013.01); *H04W 74/0808* (2013.01); *H04W 84/12* (2013.01)

(56) References Cited

U.S. PATENT DOCUMENTS

| 2013/0121234 A1* | 5/2013 | Shrivastava .......... H04L 5/0091 370/312 |
| 2014/0036757 A1 | 2/2014 | Kim et al. |
| 2014/0211775 A1* | 7/2014 | Sampath ............... H04W 28/06 370/338 |
| 2015/0327276 A1* | 11/2015 | Rebeiz ............. H04W 72/0493 370/329 |

FOREIGN PATENT DOCUMENTS

| CN | 102763474 | 10/2012 |
| JP | 2013518503 | 5/2013 |
| JP | 2014502812 | 2/2014 |
| KR | 1020120106859 | 9/2012 |
| KR | 1020130112929 | 10/2013 |
| WO | 2011105809 | 9/2011 |

* cited by examiner

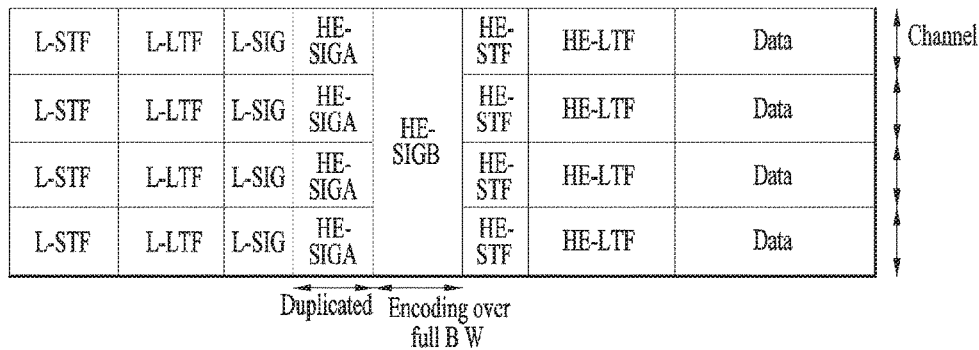

METHOD FOR SUPPORTING FLEXIBLE RESOURCE ALLOCATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/009348, filed on Sep. 4, 2015, which claims the benefit of U.S. Provisional Application No. 62/045,575, filed on Sep. 4, 2014, the contents of which are all hereby incorporated by reference herein in its entirety.

TECHNICAL FIELD

The present disclosure relates to a wireless communication system, and more particularly, to a method and device for supporting flexible resource allocation within a group based on a group ID in a wireless LAN system.

BACKGROUND ART

Although the below-described signal transmission methods are applicable various wireless communication systems, a wireless local area network (WLAN) system will be described as an example of a system, to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DISCLOSURE

Technical Problem

An object of the present invention is to provide a method of, at a station, efficiently transmitting a signal in a wireless communication system and an apparatus therefor.

More specifically, in IEEE 802.11ax which is a next-generation wireless local area network (WLAN) among wireless communication systems, a resource allocation method using orthogonal frequency divisional multiple access (OFDMA) or multi-user multiple input multiple output (MIMO) is efficiently defined.

Another object of the present invention is to acquire various effects understood from the detailed description of the present invention in addition to the above-described object.

Technical Solution

The object of the present invention can be achieved by providing a method for transmitting a signal by a station (STA) operating in a wireless LAN system, the method including preparing resource allocation information for transmission of data from a first STA to a plurality of STAs in an Orthogonal Frequency Division Multiple Access (OFDMA) scheme or a Multi-User MIMO (MU-MIMO) scheme and transmitting the same to the plurality of STAs, and transmitting data to the plurality of STAs according to the resource allocation information, wherein the resource allocation information includes a group ID indicating the plurality of STAs, a resource allocation bitmap having a form common to the plurality of STAs, and resource allocation order information specifying order of STAs to be allocated resources in a group.

In another aspect of the present invention, provided herein is a station (STA) for transmitting a signal in a wireless communication system, including a processor configured to prepare resource allocation information for transmission of data to a plurality of STAs in an Orthogonal Frequency Division Multiple Access (OFDMA) scheme or a Multi-User MIMO (MU-MIMO) scheme, and a transceiver connected to the processor and configured to transmit the resource allocation information and the data to the plurality of STAs, wherein the processor allows the resource allocation information to include a group ID indicating the plurality of STAs, a resource allocation bitmap having a form common to the plurality of STAs, and resource allocation order information specifying order of STAs to be allocated resources in a group.

The resource allocation order information may predefine order combinations of the STAs to be allocated the resources in the group, and have a format of a permutation index indicating the order combinations of the STAs.

The resource allocation order information may have a format of a shifting index indicating a degree of shifting the order of the STAs to be allocated the resources in the group in a predetermined order.

The resource allocation bitmap may indicate a subband configuration serving as a unit of resource allocation in an entire frequency band through whether a subsequent bit in the resource allocation bitmap is toggled compared to a preceding bit. Specifically, when a first subsequent bit is not toggled compared to a first preceding bit in the resource allocation bitmap, a subband corresponding to the first preceding bit and a subband corresponding to the first subsequent bit may be allocated to the same STA. When a second subsequent bit is toggled compared to a second preceding bit in the resource allocation bitmap, a subband corresponding to the second preceding bit and a subband corresponding to the second subsequent bit may be allocated to different STAs. In this case, the resource allocation information further includes Per STA information indicating whether a subband configured according to the resource allocation bitmap is allocated to each of the plurality of STAs.

Alternatively, the resource allocation bitmap may have a length corresponding to the number of the STAs, and indicate each of the plurality of STAs is allocated a resource.

The resource allocation order information may have an information format specifying order of STAs to be allocated resources by the resource allocation bitmap among the plurality of STAs. Alternatively, the resource allocation order information may have an information format specifying order of STAs, the number of the STAs corresponding to the number of the plurality of STAs referred to by the group ID.

A value of the group ID may indicate one of a first group ID interval or a second group ID interval, wherein different schemes for transmission of data to the plurality of STAs may be indicated through whether the value of the group ID indicates the first group ID interval or the second group ID interval.

Specifically, the method may further include transmitting, when a value of the group ID is in a first group ID interval, the data to the plurality of STAs in the OFDMA scheme, and transmitting, when the value of the group ID is in a second group ID interval, the data to the plurality of STAs in the MU-MIMO scheme.

The resource allocation information may be transmitted through an HE-SIG field.

Advantageous Effects

According to the present invention, a station can efficiently transmit a signal in a wireless communication system. More specifically, in IEEE 802.11ax which is a next-generation wireless local area network (WLAN) among wireless communication systems, it is possible to efficiently perform a resource allocation method using orthogonal frequency divisional multiple access (OFDMA) or multi-user multiple input multiple output (MIMO).

The effects which can be obtained by the present invention are not limited to the above-described effects and other effects which are not described herein will become apparent to those skilled in the art from the following description.

DESCRIPTION OF DRAWINGS

FIGS. 4 to 8 are diagrams illustrating an example of a frame structure used in an IEEE 802.11 system.

FIG. 9 is a diagram showing an example of a PPDU format which may be used in the present invention.

BEST MODE

Figure 1:
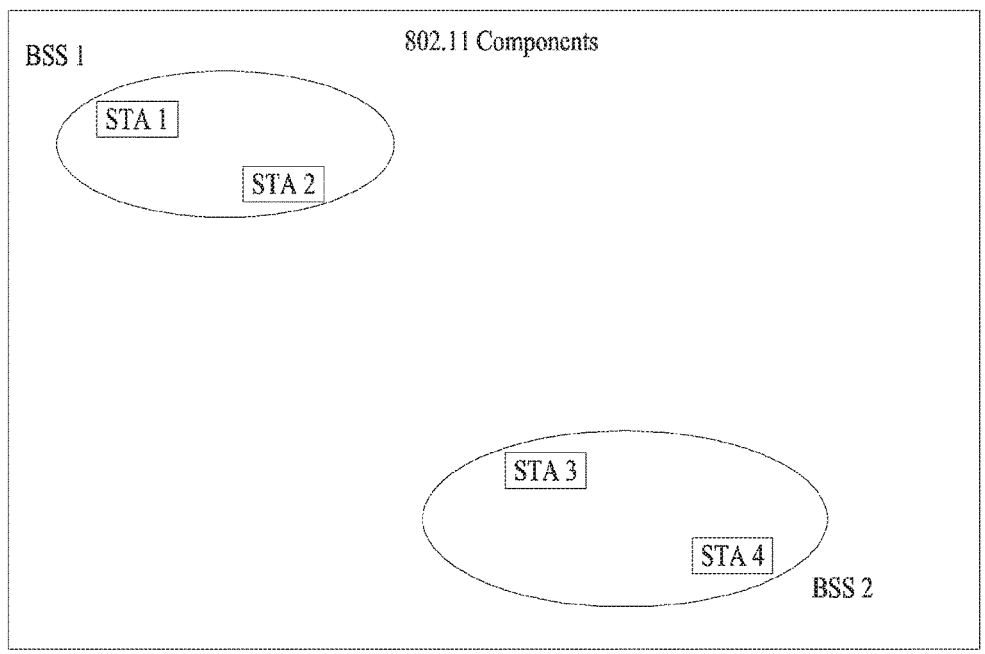
FIG. 1 is a diagram illustrating an exemplary configuration of a Wireless Local Area Network (WLAN) system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
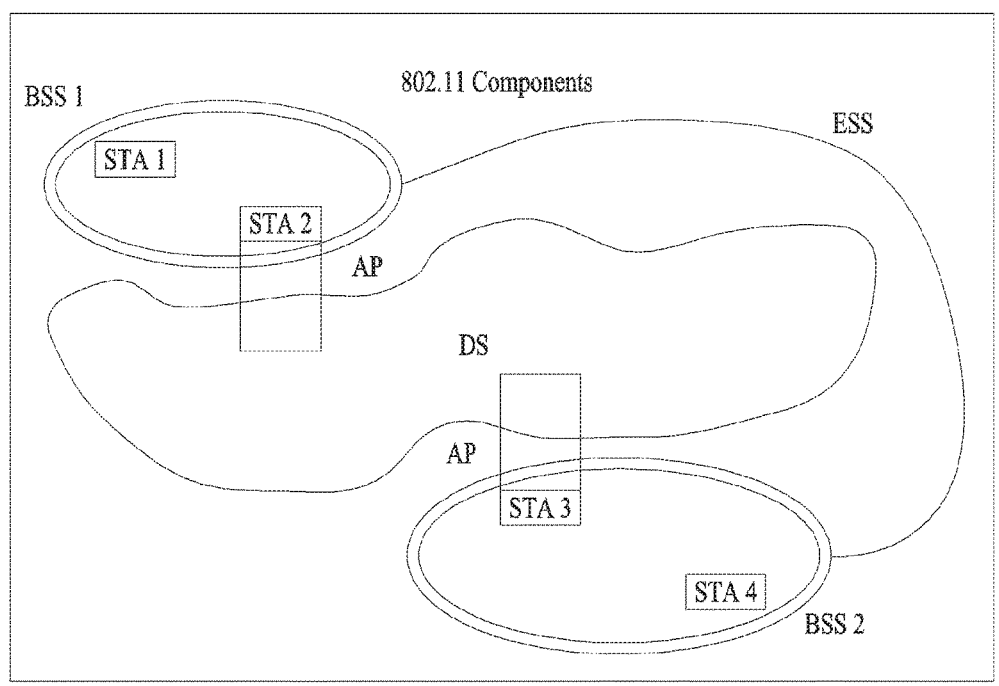
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
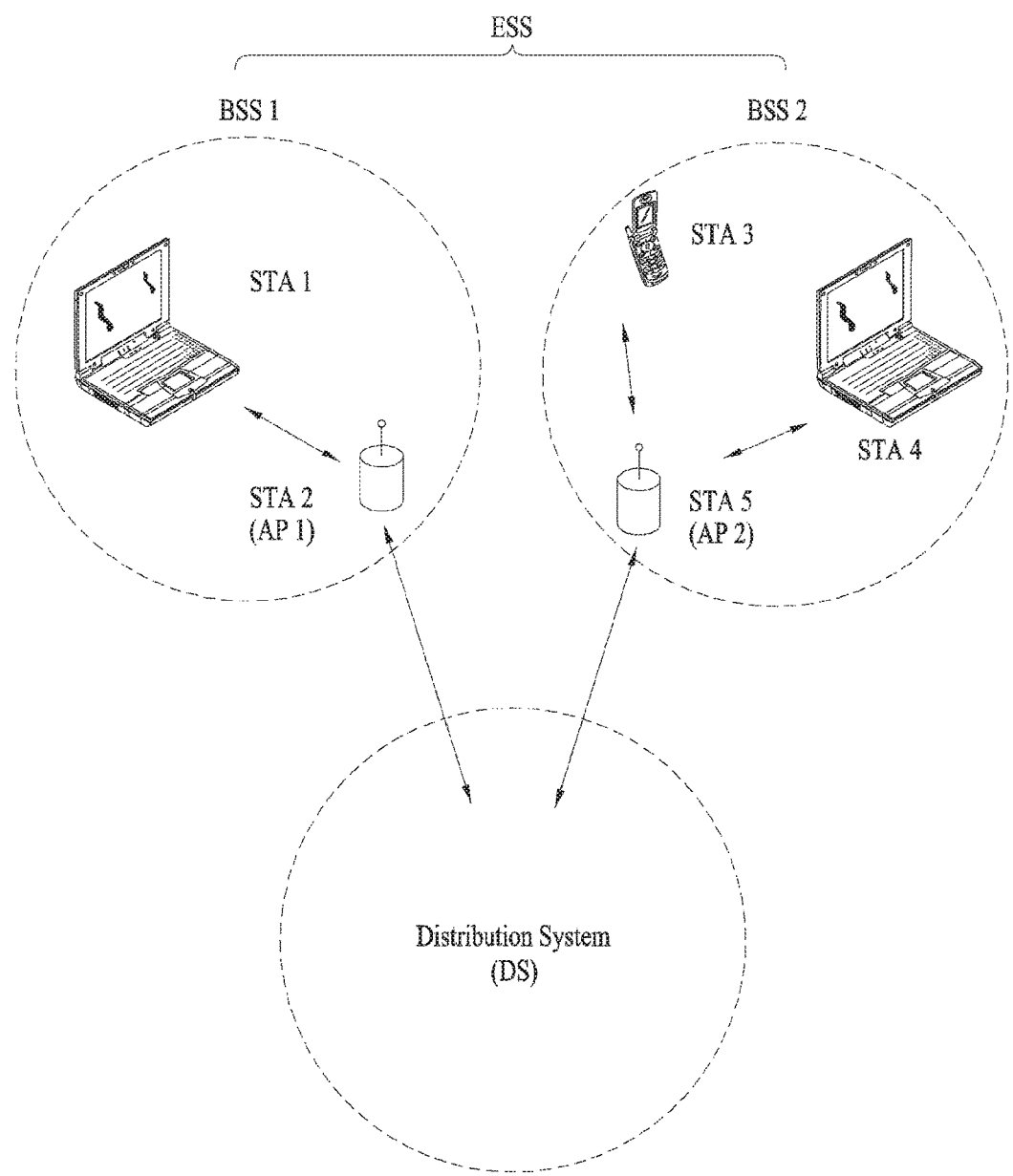
FIG. 3 is a diagram illustrating an exemplary structure of a WLAN system.
Figure 4:
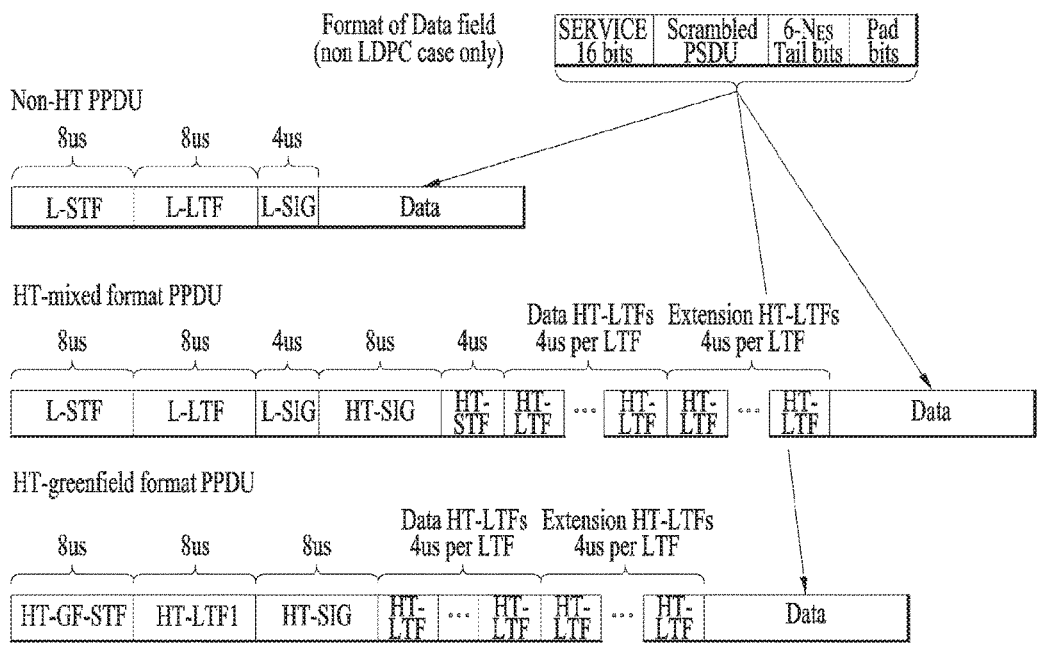

FIG. 3 is a diagram illustrating an exemplary structure of a WLAN system. FIG. 3 shows an example of an infrastructure BSS including a DS.

In the example of FIG. 3, BSS1 and BSS2 configure an ESS. In the WLAN system, a station operates according to MAC/PHY rules of IEEE 802.11. The station includes an AP station and a non-AP station. The non-AP station corresponds to an apparatus directly handled by a user, such as a laptop or a mobile telephone. In the example of FIG. 3, a station 1, a station 3 and a station 4 are non-AP stations and a station 2 and a station 5 are AP stations.

In the following description, the non-AP station may be referred to as a terminal, a wireless transmit/receive unit (WTRU), a user equipment (UE), a mobile station (MS), a mobile terminal, a mobile subscriber station (MSS), etc. In addition, the AP corresponds to a base station (BS), a node-B, an evolved node-B (eNB), a base transceiver system (BTS), a femto BS, etc. in different wireless communication fields.

FIGS. 4 to 8 are diagrams illustrating an example of a frame structure used in an IEEE 802.11 system.

An STA may receive a physical layer packet data unit (PPDU). At this time, the PPDU frame format may include a short training field (STF), a long training field (LTF), a signal (SIG) field and a data field. At this time, for example, the PPDU frame format may be set based on the type of the PPDU frame format.

For example, a non-high throughput (HT) PPDU frame format may include a legacy-STF (L-STF), a legacy-LTF (L-LTF), an SIG field and a data field.

In addition, any one of an HT-mixed format PPDU and an HT-Greenfield format PPDU may be set as the type of the PPDU frame format. At this time, in the above-described PPDU format, additional (different types of) STFs, LTFs and SIG fields may be included between the SIG field and the data field.

Figure 5:
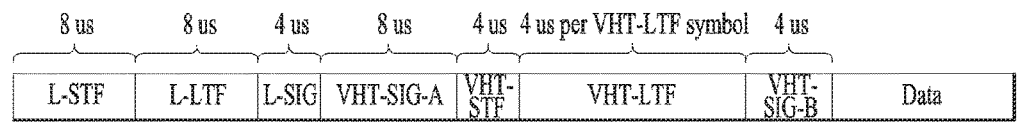

In addition, referring to FIG. 5, a very high throughput (VHT) PPDU format may be set. At this time, even in the VHT PPDU format, additional (different types of) STFs, LTFs and SIG fields may be included between the SIG field and the data field. More specifically, in the VHT PPDU format, at least one of a VHT-SIG-A field, a VHT-STF field, a VHT-LTF field and a VHT SIG-B field may be included between the L-SIG field and the data field.

At this time, the STF is a signal for signal detection, automatic gain control (AGC), diversity selection, accurate time synchronization, etc. and the LTF is a signal for channel estimation, frequency error estimation, etc. A combination of the STF and the LTF may be referred to as a PLCP preamble and the PLCP preamble may refer to a signal for synchronization and channel estimation of an OFDM physical layer.

Figure 6:
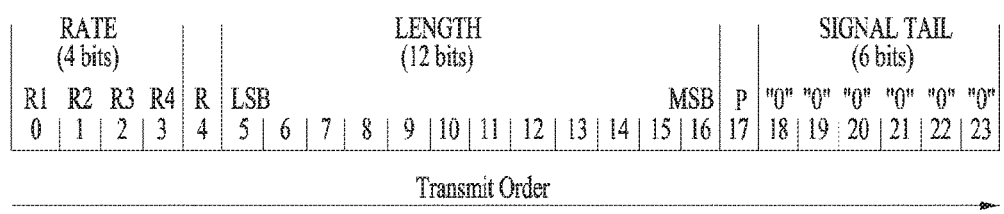

Referring to FIG. 6, the SIG field may include a RATE field and a LENGTH field. The RATE field may include information about modulation and coding rate of data. The LENGTH field may include information about the length of data. Additionally, the SIG field may include a parity bit, an SIG TAIL bit, etc.

The data field may include a SERVICE field, a PLCP service data unit (PSDU) and a PPDU Tail bit and further may include a padding bit if necessary.

Figure 7:
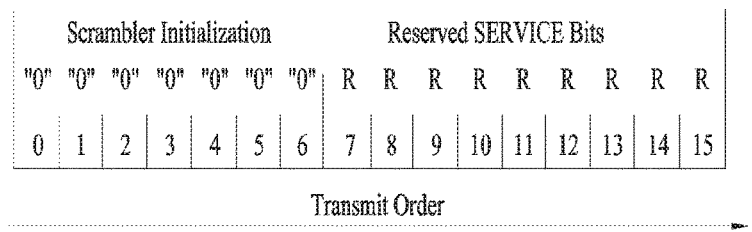

Referring to FIG. 7, some bits of the SERVICE field may be used for synchronization of a descrambler in a receiver, and some bits may be composed of reserved bits. The PSDU corresponds to a MAC protocol data unit (PDU) defined at a MAC layer and may include data created/used at a higher layer. The PPDU TAIL bit may be used to return an encoder to a zero state. The padding bit may be used to adjust the length of the data field to a predetermined length.

In addition, for example, as described above, the VHT PPDU format may include the additional (different types of) STF, LTF and SIG fields. At this time, in the VHT PPDU, L-STF, L-LTF and L-SIG may be a part of non-VHT of the VHT PPDU. At this time, in the VHT PPDU, VHT-SIG-A, VHT-STF, VHT-LTF and VHT-SIG-B may be part of VHT. That is, in the VHT PPDU, regions for a Non-VHT field and a VHT field may be defined. At this time, for example, VHT-SIG-A may include information for interpreting the VHT PPDU.

At this time, for example, referring to FIG. 8, VHT-SIG-A may be composed of VHT SIG-A1 ((a) of FIG. 8) and VHT SIG-A2 ((b) of FIG. 8). At this time, each of VHT SIG-A1 and VHT SIG-A2 may include 24 data bits and VHT SIG-A1 may be transmitted earlier than VHT SIG-A2. At this time, VHT SIG-A1 may include a BW field, an STBC field, a Group ID field, an NSTS/Partial AID field, a TXOP_PS_NOT_ALLOWED field and a Reserved field. In addition, VHT SIG-A2 may include a Short GI field, a Short GI NSYM Disambiguation field, an SU/MU[0] Coding field, an LDPC Extra OFDM Symbol field, an SU VHT-MCS/MU[1-3] Coding field, a Beamformed field, a CRC field, a Tail field and a Reserved field. Through this, information on the VHT PPDU may be confirmed.

FIG. 9 is a diagram showing an example of a PPDU format which may be used in the present invention.

As described above, various types of PPDU formats may be set. At this time, as an example, a new type of PPDU format may be proposed. The PPDU may include an L-STF field, an L-STF field, an L-SIG field and a data field. For example, a PPDU frame may further include a high efficiency (HE) SIG-A field, a HE-STF field, a HE-LTF field and a HE SIG-B field. For example, the HE SIG-A field may include common information. For example, the common information may include a bandwidth field, a guard interval (GI) field, a length field and a BSS color field. For example, an L-part (L-STF, L-LTF and L-SIG) may be transmitted in the form of an SFN in units of 20 MHz in the frequency domain. In addition, for example, the HE SIG-A field may be transmitted in the form of an SFN in units of 20 MHz, similarly to the L part. For example, if a channel is greater than 20 MHz, the L parts and the HE SIG-A field may be duplicated and transmitted in units of 20 MHz. In addition, the HE SIG-B field may be UE-specific information. For example, the user-specific information may include station AID, resource allocation information (e.g., allocation size), MCS, Nsts, coding, STBC, TXBF, etc. For example, the HE SIG-B field may be transmitted over the full bandwidth.

For example, referring to (b) of FIG. 9, the PPDU may be transmitted through a band of 80 MHz. At this time, the L part and the HE SIG-A part may be duplicated and transmitted in units of 20 MHz and the HE SIG-B field may be transmitted over the full bandwidth of 80 MHz. However, the above-described transmission method is exemplary and is not limited to the above-described embodiments.

Figure 10:
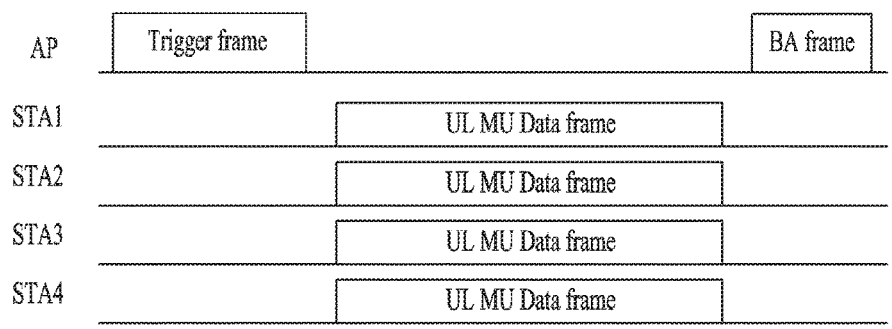
FIG. 10 is a diagram illustrating an uplink among the concepts of multi-user transmission applicable to the present invention.

FIG. 10 is a diagram illustrating an uplink among the concepts of multi-user transmission applicable to the present invention.

As described above, the AP may acquire a TXOP for accessing a medium, occupy the medium through contention and transmit a signal. Referring to FIG. 10, an AP station may transmit a trigger frame to a plurality of stations in order to perform UL MU transmission. At this time, for example, the trigger frame may include information on resource allocation location and size, station IDs, MCS, and MU type (=MIMO or OFDMA). That is, uplink multi-user (UL MU) transmission may mean that a plurality of stations as multiple users performs uplink transmission to the AP station. At this time, the AP station may transmit the trigger frame to the plurality of stations such that the plurality of stations performs uplink data transmission.

The plurality of stations may transmit data to the AP after an SIFS has elapsed, based on a format indicated by the trigger frame. Thereafter, the AP may transmit ACK/NACK information to the station and perform UL MU transmission.

Figure 11:
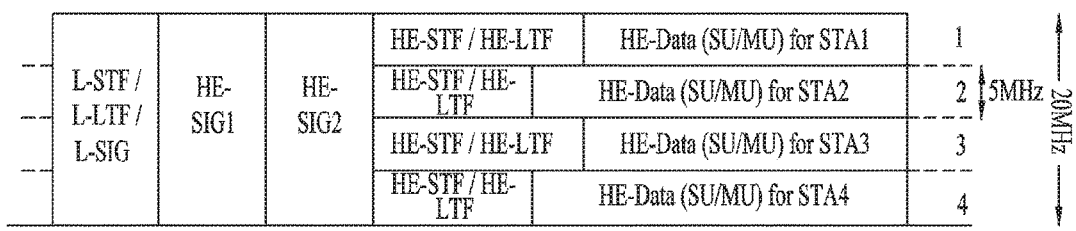
FIG. 11 is a diagram illustrating an STA transmitting a frame in a group ID-based OFDMA scheme according to an embodiment of the present invention.

FIG. 11 is a diagram illustrating an STA transmitting a frame in a group ID-based OFDMA scheme according to an embodiment of the present invention.

FIG. 11 illustrates a situation wherein frames are transmitted to STA1, STA2, STA3, and STA4, and frame allocation/transmission information about each STA may be transmitted in HE-SIG1/2. Assuming that STAs 1, 2, 3 and 4 belong to one group (Group ID=1), the STA information included in the HE-SIG may include Group ID (=1) and resource allocation information (e.g., Nsts (>0, 1 to 8)) about STAs 1, 2, 3 and 4.

Although FIG. 11 illustrates an example in which resources are allocated to a plurality of STAs referred to by a group ID in units of 5 MHz, the unit of resource allocation need not be limited thereto.

Regarding the above description, examples of the unit of minimum resource granularity will be described below.

Basic Direction (1) First resource unit—Regular resource unit (RRU) or basic tone unit (BTU); Hereinafter, RRU and BTU are used interchangeably and have the same meaning.

The first resource unit is a large resource unit and, if possible, a BW size of legacy Wi-Fi may be reused (e.g., 26 tones, 56 tones, 114 tones, 242 tones, etc.). The size of the first resource unit may be fixed regardless of BW and increased according to BW.

(2) Second resource unit—Irregular resource unit (IRU) or small tone unit (STU); Hereinafter, IRU and STU are used interchangeably and have the same meaning.

The second resource unit indicates a small resource unit and a method of allocating left/right guard tones for interference mitigation to both ends of a BW and allocating an RRU and an IRU to the remaining region except for central DC tones is defined. If possible, the number of left/right guard tones and DC tones may be maintained regardless of BW (e.g., left/right guard tone=6/5 or 7/6 tones, DC=5 or 3 tones, etc.).

An allocation method and the number of allocated tones may be set in consideration of resource use efficiency, scalability according to BW, etc. In addition, the second resource unit may be predefined and may be delivered through signaling (e.g., SIG) among various methods.

Method 1—BW Common Tone Unit (RRU/BTU Size=56 Subcarriers)

In this method, the size of the RRU/BTU is 56 subcarrier tones.

Figure 12:
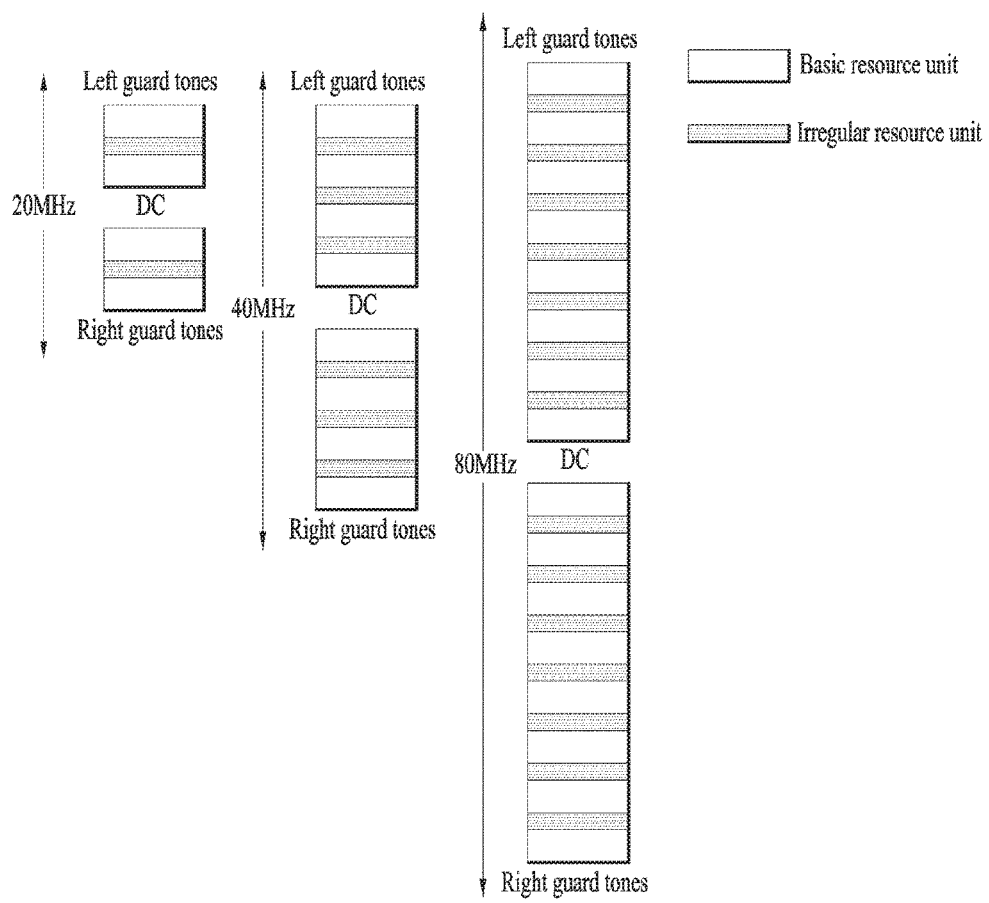
FIG. 12 is a diagram illustrating an example of defining a minimum resource allocation unit regardless of a bandwidth.

FIG. 12 is a diagram showing an example of defining a minimum resource allocation unit regardless of bandwidth.

Since 56 subcarriers are equal to basic OFDM numerology of 20 MHz in a legacy Wi-Fi system, a conventional interleaver may be reused. At this time, the size of the IRU/STU is 8 subcarrier tones. That is, assume that RRU/

BTU=56 and IRU/STU=8. However, assume that the minimum allocation unit of the IRU/STU is 2 IRUs/STUs (i.e., 16 tones).

Table 1 below shows the number of RUs, IRUs, and DCs and Gis per BW.

TABLE 1

| BW | # of RU | # of IRU | # of tones of DC + GS |
|---|---|---|---|
| 20 MHz | 4 (224 tones) | 2 (16 tones) | 16 (DC: 5, GS: 11 or DC: 3, GS: 13) |
| 40 MHz | 8 (448 tones) | 6 (48 tones) | 16 (DC: 5, GS: 11 or DC: 3, GS: 13) |
| 80 MHz | 16 (896 tones) | 14 (12 tones) | 16 (DC: 5, GS: 11 or DC: 3, GS: 13) |

As shown in Table 1 above, the number of remaining tones, that is, the number of DCs and GSs, is maintained as 16 (twice the number of IRU tones) regardless of BW.

(RU, IRU)=(56, 9)

If the IRU has a size of 9 subcarriers, per-BW numerology may be as shown in Table 2 below. A 160-MHz BW is obtained by repeatedly applying 80 MHz twice.

TABLE 2

| BW | # of RU | # of IRU | # of tones of DC + GS |
|---|---|---|---|
| 20 MHz | 4 (224 tones) | 2 (18 tones) | 14 (DC: 3, GS: 11) |
| 40 MHz | 8 (448 tones) | 5 (45 tones) | 19 (DC: 8, GS: 11 or DC: 3, GS: 16) |
| 80 MHz | 16 (896 tones) | 12 (108 tones) | 20 (DC: 3, GS: 17 or DC: , GS: 11) |

In addition to the above-described examples, various combinations of (RU, IRU) are possible as follows. For example, (RU, IRU)=(26, 8), (RU, IRU)=(26, 6), (RU, IRU)=(114, 7), etc. may also be possible.

Method 2—Method of Changing RRU Size According to BW (RRU=26/56/114 for 20/40/80 MHz, IRU=7)

In this method, the IRU is fixed to 14 regardless of BW. If two pilot signals are used, 12 data tones are advantageous for various MCS decoding methods. In particular, 80 Hz is advantageous for systematic design because RRU+IRU=114+14=128 is a divisor of 256.

The following tables show values which may be defined for each bandwidth. More specifically, Table 3 shows 80 MHz, Table 4 shows 40 MHz and Table 5 shows 20 MHz.

TABLE 3

|  | Number of tones | Number of allocation units | Total number of tones |
|---|---|---|---|
| RRU | 114 | 8 | 912 |
| IRU | 7 | 14 | 98 |
| left guard |  |  | 6 |
| right guard |  |  | 5 |
| DC |  |  | 3 |

TABLE 4

|  | Number of tones | Number of allocation units | Total number of tones |
|---|---|---|---|
| RRU | 56 | 8 | 448 |
| IRU | 7 | 6 | 42 |
| left guard |  |  | 6 |

TABLE 4-continued

|  | Number of tones | Number of allocation units | Total number of tones |
|---|---|---|---|
| right guard |  |  | 5 |
| DC |  |  | 11 |

TABLE 5

|  | Number of tones | Number of allocation units | Total number of tones |
|---|---|---|---|
| RRU | 26 | 8 | 208 |
| IRU | 7 | 4 | 28 |
| left guard |  |  | 6 |
| right guard |  |  | 5 |
| DC |  |  | 9 |

Hereinafter, a method of efficiently configuring resource allocation information based on the above description will be described.

Figure 13:
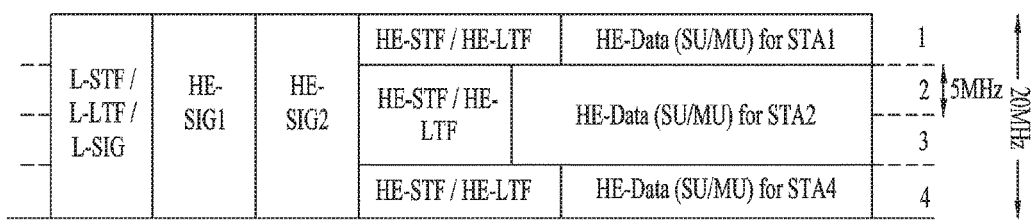
FIG. 13 is a diagram illustrating a method for configuring resource allocation information common to a plurality of STAs in configuring resource allocation information according to an embodiment of the present invention.

FIG. 13 is a diagram illustrating a method for configuring resource allocation information common to a plurality of STAs in configuring resource allocation information according to an embodiment of the present invention.

Specifically, FIG. 13 illustrates an example of allocation of OFDMA resources to STAs 1, 2, and 4 which belong to Group ID 1. Since resources are allocated only to STAs 1, 2, and 4, the number of space-time streams (Nsts) for STAs 1, 2, and 4 may be set to a value greater than 0, and Nsts for STA3 may be set to 0 in terms of VHT, for example. However, in an embodiment of the present invention, it is proposed that the resource configuration information be presented using a resource allocation bitmap commonly applied to a plurality of STAs.

The resource allocation bitmap may indicate a subband configuration, which is a unit of resource allocation in the entire frequency band, through an indication indicating whether or not a subsequent bit in the resource allocation bitmap is toggled compared to the preceding bit. Specifically, if a first subsequent bit in the resource allocation bitmap is not toggled compared to a first preceding bit, the subband (e.g., SB1) corresponding to the first preceding bit and the subband (e.g., SB2) corresponding to the first subsequent bit may be allocated to the same STA. On the other hand, if a second subsequent bit in the resource allocation bitmap is toggled compared to a second preceding bit, the subband (e.g., SB2) corresponding to the second preceding bit and the subband (e.g., SB3) corresponding to the second subsequent bit may be allocated to different STAs.

In the example of FIG. 13, the resource allocation bitmap may be expressed as "1001". That is, since 0 of the second bit is toggled compared to 1 of the first bit, the map may indicate that the corresponding resource units are allocated to different STAs. 0 of the third bit is not toggled compared to 0 of the second bit, and thus the corresponding subbands may be allocated to the same STA. Since 1 of the last bit is toggled compared to 0 of the preceding bit, this may indicate that the corresponding subband is allocated to another STA.

Meanwhile, in another embodiment of the present invention, resource allocation may be performed using a user bitmap. The size of the user bitmap may be determined by the maximum number of users belonging to the group. In the above example, four users are supported, the user bitmap may be configured with 4 bits. In the above example, the user bitmap is set to 1111 because all 4 STAs in FIG. 11 are allocated resources. In FIG. 13, the resources are allocated only to STAs 1, 2 and 4, and thus the user bitmap is set to 1101. In this case, only the Nsts information about the assigned user (STA) will be included in the SIG. In the example of FIG. 13, only Nsts information about STAs 1, 2 and 4 may be included.

Resource allocation position and size information about an STA and a resource to be allocated may be transmitted a in the HE-SIG.

As described above, the resource allocation information according to an embodiment of the present invention may have the following format.

TABLE 6

| Contents in HE-SIG1 & HE-SIG2 | | | |
|---|---|---|---|
| Type | Name | Size (bits) | Notes |
| Common information | BW | 2 | |
| | GI | 1 | |
| | BSS index | 6 | |
| | Number of GID | 2 | |
| Per Group information | GID | 6 | |
| | User Bitmap | 4 | |
| | Allocation size | 3 | |
| | MU/O DMA indication | 1 | |
| | Allocation Bitmap | 1 | Included in the case of OFDMA. |
| Per STA information (repeated as many times as the total number of STAs) | Nsts | 3 | |
| | MCS | 4 | |
| | Coding | 1 | |
| | STBC | 1 | |
| | Beamformed | 1 | |

As shown above, the Per Group Information is repeatedly added, wherein the number of repetitions corresponds to the value of the Number of GID, and the Per STA information may be repeatedly added, wherein the number of repetitions corresponds to the number of assigned STAs. According to the Allocation Bitmap in the Per Group Information, when resources are allocated through the group ID as described above, the STAs are allocated resources only in a specified order (STA1, STA2, STA3, and STA4 in the above example). This scheme may fail to allocate a proper resource to the UE. For example, in FIGS. 11 and 13, STA1 is assigned a resource first, and STA4 is always assigned a resource for the last time. If resources are allocated to one or more STAs in the group, STA4 may not be assigned a resource first.

According to a preferred embodiment of the present invention, in order to solve the above-mentioned problem, it is proposed that the resource allocation information additionally include resource allocation order information for designating the order in which the STAs are allocated resources in the group. Various types of resource allocation order information are possible, and two specific types will be described as an example below.

Embodiment 1—Using Permutation Index

The AP may transmit a permutation index in allocating OFDMA resources based on GID. The resource allocation order of the STAs belonging to the GID is determined based on the permutation index. Preferably, one permutation index is used per GID. The permutation index may be configured as follows.

When the maximum number of STAs that may belong to GID is N, the total number of permutation indexes is N! and the size of indexes is determined by ceiling (log 2 (N!)) bits. In the above example, since the total number of STAs that may belong to the GID is 4, the total number of permutation indexes is 24, and the size is 5 bits. N may be limited by the number of users assigned in the GID.

If two STAs are allocated in the GID, N is 2, and the size of the indexes is determined by 1 bit.

An example of configuring a permutation index when N=4 is given below.

TABLE 7

| Permutation index | Order of allocation | | | |
|---|---|---|---|---|
| Permutation index | 1 | 2 | 3 | 4 |
| 1 | STA1 | STA2 | STA3 | STA4 |
| 2 | STA1 | STA2 | STA4 | STA3 |
| 3 | STA1 | STA3 | STA2 | STA4 |
| 4 | STA1 | STA3 | STA4 | STA2 |
| 5 | STA1 | STA4 | TA2 | STA3 |
| 6 | STA1 | STA4 | STA3 | STA2 |
| 7 | STA2 | STA1 | STA3 | STA4 |
| 8 | STA2 | STA1 | STA4 | STA3 |
| 9 | STA3 | STA1 | STA2 | STA4 |
| 10 | STA3 | STA1 | STA4 | STA2 |
| 11 | STA4 | STA1 | STA2 | STA3 |
| 12 | STA4 | STA1 | STA3 | STA2 |
| 13 | STA2 | STA3 | STA1 | STA4 |
| 14 | STA2 | STA4 | STA1 | STA3 |
| 15 | STA3 | STA2 | STA1 | STA4 |
| 16 | STA3 | STA4 | STA1 | STA2 |
| 17 | STA4 | STA2 | STA1 | STA3 |
| 18 | STA4 | STA3 | STA1 | STA2 |
| 19 | STA2 | STA3 | STA4 | STA1 |
| 20 | STA2 | STA4 | STA3 | STA1 |
| 21 | STA3 | STA2 | STA4 | STA1 |
| 22 | STA3 | STA4 | STA2 | STA1 |
| 23 | STA4 | STA2 | STA3 | STA1 |
| 24 | STA4 | STA3 | STA2 | STA1 |

If such a permutation index is additionally included, the resource allocation information included in the HE-SIG field may have the following format.

TABLE 8

| Contents in HE-SIG | | | |
|---|---|---|---|
| Type | Name | Size (bits) | Notes |
| Common information | BW | 2 | |
| | GI | 1 | |
| | BSS index | 6 | |
| | Number of GID | 2 | |
| Per Group information | GID | 6 | |
| | User Bitmap | 4 | |
| | Allocation size | 3 | |
| | MU/OFDMA indication | 1 | |
| | Allocation Bitmap | 1 | Included in the case of OFDMA. |
| | Permutation index | 5 | Included in the case of OFDMA |
| Per STA information (repeated as many times as the total number of STAs) | Nsts | 3 | |
| | MCS | 4 | |
| | Coding | 1 | |
| | STBC | 1 | |
| | Beamformed | 1 | |

Figure 14:
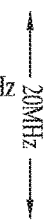
FIGS. 14 and 15 are diagrams illustrating a resource allocation scheme when a permutation index is used according to an embodiment of the present invention.
Figure 15:
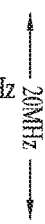

FIGS. 14 and 15 are diagrams illustrating a resource allocation scheme when a permutation index is used according to an embodiment of the present invention.

As shown in FIG. 14, for STAs 1, 2, 3 and 4, which are referred to by the same group ID, when resources are allocated in order of STA 1, 4, 2, 3, the resource allocation may be represented by permutation Index 5 of Table 7.

Meanwhile, when the resource allocation information is configured as shown in Table 8, each STA may check if a resource is allocated thereto through the user bitmap. In the case of FIG. 14, the user bitmap may indicate "1111". Here, the order of the STAs corresponding to each bit of the user bitmap may be STA 1, 2, 3, 4, which is the original order of the STAs, or the order specified by the above permutation index, that is, STA 1, 4, 2, 3.

In the example of FIG. 15, STAs 1, 2, 3 and 4 are referred to by the group ID. This example may correspond to a case where the permutation index is 8. In this case, the order of the STAs may be determined as STAs 2, 1, 4, and 3 according to the permutation index, but it may be indicated that there is no resource allocated to STA 1, using, for example, the user bitmap.

Meanwhile, in an embodiment of the present invention, a permutation index may be defined and operated only for STAs which are allocated resources. In order to reduce the singling overhead, the number of combinations according to the permutation index may be limited as follows.

TABLE 9

| Permutation index | Order of allocation | | | |
|---|---|---|---|---|
| Permutation index | 1 | 2 | 3 | 4 |
| 1 | STA1 | STA2 | STA3 | STA4 |
| 2 | STA1 | STA3 | STA2 | STA4 |
| 3 | STA1 | STA4 | STA2 | STA3 |
| 4 | STA2 | STA1 | STA3 | STA4 |
| 5 | STA3 | STA1 | STA2 | STA4 |
| 6 | STA4 | STA1 | STA2 | STA3 |
| 7 | STA2 | STA3 | STA1 | STA4 |
| 8 | STA3 | STA2 | STA1 | STA4 |
| 9 | STA4 | STA2 | STA1 | STA3 |
| 10 | STA2 | STA3 | STA4 | STA1 |
| 11 | STA3 | STA2 | STA4 | STA1 |
| 12 | STA4 | STA2 | STA3 | STA1 |

In this case, the size of the permutation index will be 4 bits. Limiting the combinations that make up the permutation index may be useful in reducing the size of the index when N is large.

Embodiment 2—Using Shifting Index

In another embodiment of the present invention, the resource allocation order information may be configured using a shifting index that defines the degree of shifting the order of the STAs. An example of HE-SIG information using a shifting Index may be given as follows.

TABLE 10

| | Contents in HE-SIG | | |
|---|---|---|---|
| Type | Name | Size (bits | Notes |
| Common information | BW | 2 | |
| | GI | 1 | |
| | BSS index | 6 | |
| | Number of GID | 2 | |
| Per Group information | GID | 6 | |
| | User Bitmap | 4 | |
| | Allocation size | 3 | |
| | MU/OFDMA indication | 1 | |
| | Allocation Bitmap | 1 | Included in the case of OFDMA. |
| | Cyclic Shifting index | 3 | Bit 0: indicates whether the shifting is left (or upper) shifting or right (or down) shifting.- 0: left (or upper) shifting- 1: right (down) shifting Bit1Bit2: indicates the unit of shifting. E.g.) 00: 1 01: 2 10: 3 11: 4 This is simply an example and may change depending on the size. |
| Per STA information (repeated as many times as the total number of STAs.) | Nsts | 3 | |
| | MCS | 4 | |
| | Coding | 1 | |
| | STBC | 1 | |
| | Beamformed | 1 | |

Figure 16:
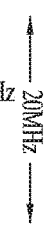
FIGS. 16 and 17 are diagrams illustrating utilization of a shifting index according to an embodiment of the present invention.
Figure 17:
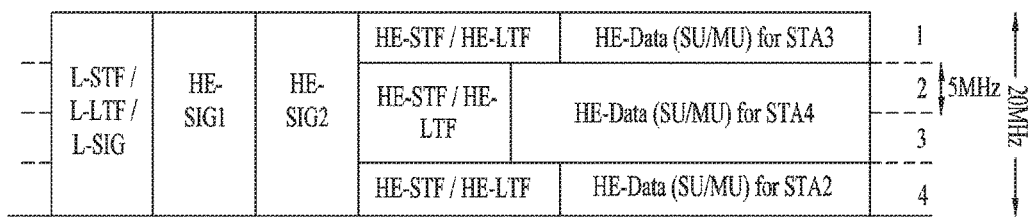

FIGS. 16 and 17 are diagrams illustrating utilization of a shifting index according to an embodiment of the present invention.

According to definition of the shifting index according to Table 10, when Bit0 of the shifting index indicates 1 and Bit0Bit2 indicates 2, the allocation of resources may be performed as in the example (each of STAs 1, 2, 3 and 4 is allocated 5 MHz). In this case, resources are allocated in order of STA3, STA4, STA1, and STA2 because the allocation order of the STAs is shifted by two positions to the right.

According to the definition of Table 10, when Bit0 of the shifting index indicates 0 and Bit0Bit2 indicates 1, resource allocation may be performed as in the example of FIG. 17 (STAs 2, 3 and 4, first and third allocations are allocation of 5 MHz, and second allocation is allocation of 10 MHz). STA3, STA4, and STA2 may be allocated in this order because the allocation order of the STAs is shifted by one position to the left.

The embodiments described above are various examples of resource allocation using the group ID. Hereinafter, a method of transmitting additional information using the group ID will be described. That is, a method for allocating resources differently according to the grouping type of the UE is proposed.

FIGS. 18 to 21 are diagrams illustrating a method for indicating various kinds of information according to a group ID according to an embodiment of the present invention.

Figure 18:
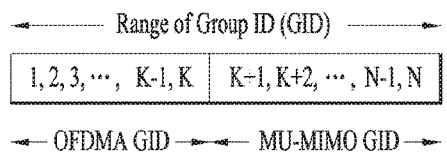
FIGS. 18 to 21 are diagrams illustrating a method for indicating various kinds of information according to a group ID according to an embodiment of the present invention.

First, as shown in FIG. 18, grouping may be performed differently depending on whether the employed scheme is OFDMA or MU-MIMO. That is, in the range of Group ID, a specific region may be used for OFDMA and another specific region may be used for MU-MIMO. Therefore, a UE supporting both OFDMA and MU-MIMO may be allocated all GIDs for the two groups.

Alternatively, the LSB (or MSB) of the Group ID indicates the type. If the LSB (or MSB) is set to 0, this indicates MU-MIMO GID. If the LSB (or MSB) is set to 1, this indicates GID for OFDMA.

Figure 19:
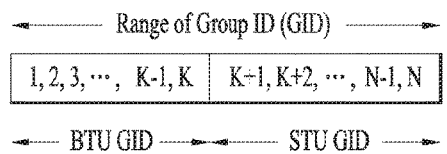

Alternatively, as shown in FIG. 19, a specific region may be allocated for BTU (Basic Tone Unit) allocation and a specific region may be allocated for STU (Small Tone Unit) allocation in the range of Group ID. In the range of Group ID, a specific region may be used for OFDMA and a specific region may be used for MU-MIMO. Alternatively, the LSB (or MSB) of the Group ID may indicate the type. In this case, if the LSB is set to 0, this indicates the BTU GID. If the LSB is set to 1, this indicates the STU GID.

Figure 20:
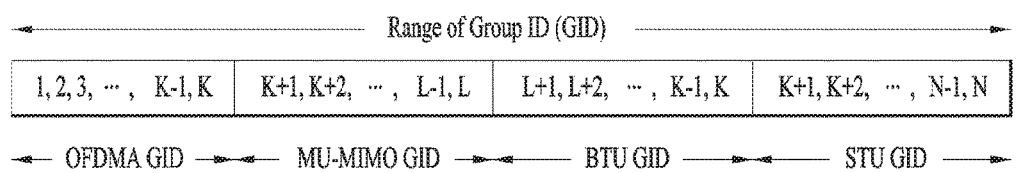
Figure 21:
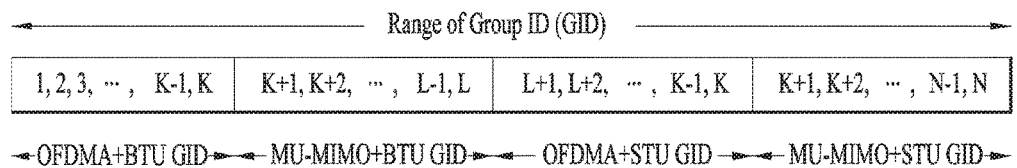

The Group ID region may be divided into four areas, i.e., OFDMA, MU-MIMO, BTU, and STU as shown in FIG. 20, or the areas may be used in combination as shown in FIG. 21.

Figure 22:
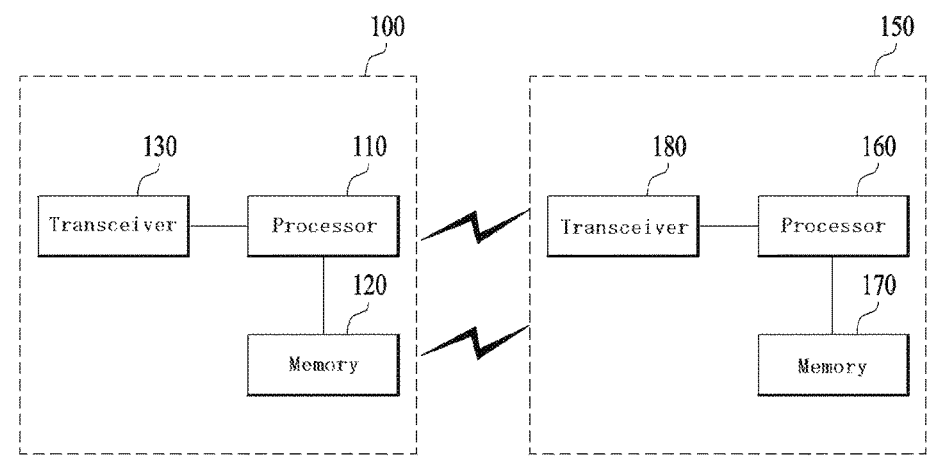
FIG. 22 is a block diagram illustrating an exemplary configuration of an AP (or a BS) and an STA (or a terminal) according to an embodiment of the present invention.

FIG. 22 is a block diagram illustrating an exemplary configuration of an AP (or a BS) and an STA (or a terminal) according to an embodiment of the present invention.

The AP 100 may include a processor 110, a memory 120, and a transceiver 130. The STA 150 may include a processor 160, a memory 170, and a transceiver 180.

The transceivers 130 and 180 may transmit/receive radio signals and may implement a physical layer according to, for example, an IEEE 802 system. The processors 110 and 160 may be connected to the transceivers 130 and 180 to implement a physical layer and/or a MAC layer according to the IEEE 802 system. The processors 110 and 160 may be configured to perform operations in accordance with one or more combinations of the various embodiments of the invention described above. In addition, modules implementing the operations of the AP and the STA according to the various embodiments of the present invention described above may be stored in the memories 120 and 170 and executed by the processors 110 and 160. The memories 120 and 170 may be included in the processors 110 and 160 or may be installed outside the processors 110 and 160 and connected to the processors 110 and 160 by known means.

The above description of the AP 100 and the STA 150 may be applied to a BS and a terminal in other wireless communication systems (e.g., LTE/LTE-A system), respectively.

The specific configuration of the AP and the STA may be implemented such that the above-described embodiments of the present invention are applied independently or two or more of the embodiments are applied at the same time. For the sake of clarity, redundant description will be omitted.

Figure 23:
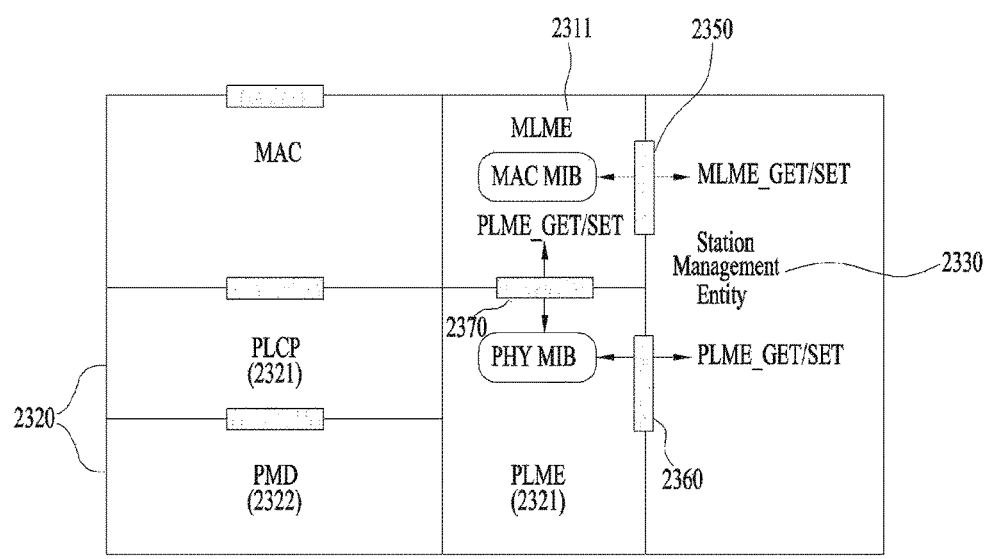
FIG. 23 illustrates an exemplary structure of a processor of an AP or an STA according to an embodiment of the present invention.

FIG. 23 illustrates an exemplary structure of a processor of an AP or an STA according to an embodiment of the present invention.

The processor of the AP or STA may have a plurality of layers, and FIG. 23 specifically illustrates a MAC sublayer 3810 and a physical layer 3820 on a data link layer (DLL) among these layers. As shown in FIG. 19, the PHY 3820 may include a Physical Layer Convergence Procedure (PLCP) entity 3821 and a Physical Medium Dependent (PMD) entity 3822. The MAC sublayer 3810 and the PHY 3820 both conceptually include a management entity called an MLME (MAC Sublayer Management Entity) 3811. These entities 3811 and 3821 provide a layer management service interface in which the layer management function operates.

In order to provide correct MAC operation, an STA Management Entity (SME) 3830 exists in each STA. The SME 3830 is a layer-independent entity that may be present in a separate management plane or may appear to be off to the side. Although the exact functions of the SME 3830 are not specifically described in this document, the entity 3830 may generally appear to serve to collect layer-dependent states from various Layer Management Entities (LMEs) and set layer-specific parameter values similarly. The SME 3830 may typically perform these functions on behalf of the typical system management entity and implement a standard management protocol.

The entities shown in FIG. 38 interact in various ways. FIG. 38 shows some examples of exchanging GET/SET primitives. The XX-GET.request primitive is used to request the value of a given MIB attribute (management information based attribute). The XX-GET.confirm primitive returns an appropriate value of the MIB attribute information if the Status is "Success". Otherwise, it is used to return an error indication in the Status field. The XX-SET.request primitive is used to request that the indicated MIB attribute be set to a given value. If the MIB attribute indicates a specific operation, it is requested that the corresponding operation be performed. The XX-SET.confirm primitive confirms that the indicated MIB attribute is set to a requested value if the status is "Success". Otherwise, it is used to return an error condition to the status field. If the MIB attribute indicates a specific operation, this confirms that the operation has been performed.

As shown in FIG. 23, the MLME 3811 and SME 3830 may exchange various MLME_GET/SET primitives through MLME_SAP 3850. In addition, various PLCM_GET/SET primitives may be exchanged between the PLME 3821 and the SME 3830 via the PLME_SAP 3860 and may be exchanged between the MLME 3811 and the PLME 3870 via the MLME-PLME_SAP 3870.

The embodiments of the present invention described above may be implemented through various means. For example, the embodiments of the present invention may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. Thus, the present invention is not intended to be limited to the embodiments described herein, but is intended to have the widest scope consistent with the principles and novel features disclosed herein. While the present invention has been particularly shown and described with reference to preferred embodiments thereof, it will be apparent to those skilled in the art that various modifications and variations can be made in the present invention without departing from the spirit or scope of the invention. Such modifications are not to be construed individually from the spirit and scope of the present disclosure.

In this specification, both an article invention and a method invention are explained, and the description of the two inventions may be supplemented as necessary.

INDUSTRIAL APPLICABILITY

Although the present invention has been described on the assumption that the present invention is applied to an IEEE 802.11 based WLAN system, the present invention is not limited thereto. The present invention may be applied to various wireless systems in the same way.

The invention claimed is:

1. A method for transmitting a physical protocol data unit (PPDU) by an access point (AP) operating in a WLAN (Wireless Local Area Network) system, the method comprising:
   generating the PPDU including a first signaling field following a legacy part (L-part), a second signaling field following the first signaling field, and a data field,
   wherein the first signaling field includes bandwidth information, guard interval information and basic service set (BSS) index, and
   wherein the second signaling field includes first information on resource allocation for transmission of the data from the AP to a plurality of STAs in an Orthogonal Frequency Division Multiple Access (OFDMA) scheme or a Multi-User MIMO (MU-MIMO) scheme; and
   transmitting the PPDU to the plurality of STAs,
   wherein the first information comprises common information included in a first field of the second signaling field and user specific information included in a second field of the second signaling field,
   wherein the first field includes second information in a format of bitmap informing sizes of resource to be allocated to each of the plurality of STA,
   wherein the second field includes third information used for allocating each of the resource, defined by the second information, to the plurality of STAs, and
   wherein different values of the bitmap of the second information inform different size-and-sequence combinations of the resource.

2. The method according to claim 1, wherein the third information is used for order combinations of the plurality of STAs to be allocated to the resource, and has a format of a permutation index informing the order combinations of the plurality of STAs.

3. The method according to claim 1, wherein the second information informs the sizes of the resource in sequence by using a toggling of a bit comparing to a preceding bit within the bitmap.

4. The method of claim 3,
   wherein, when a first subsequent bit is not toggled compared to a first preceding bit in the bitmap, a subband corresponding to the first preceding bit and a subband corresponding to the first subsequent bit are allocated to a same STA, and
   wherein, when a second subsequent bit is toggled compared to a second preceding bit in the bitmap, a subband corresponding to the second preceding bit and a subband corresponding to the second subsequent bit are allocated to different STAs.

5. The method of claim 3, wherein the first information further comprises fourth information for whether a subband configured according to the second information is allocated to each of the plurality of STAs.

6. The method according to claim 1, wherein the second information has a length corresponding to the number of the STAs, and indicates each of the plurality of STAs is allocated a resource.

7. The method according to claim 1, wherein the third information has an information format specifying order of STAs to be allocated resources by the second information among the plurality of STAs.

8. The method according to claim 1, wherein the third information has an information format specifying order of STAs, and a number of the STAs corresponding to a number of the plurality of STAs.

9. An access point (AP) for transmitting a physical protocol data unit (PPDU) in a wireless communication system, the AP comprising:
   a processor configured to generate the PPDU including a first signaling field following a legacy part (L-part), a second signaling field following the first signaling field, and a data field,
   wherein the first signaling field includes bandwidth information, guard interval information and basic service set (BSS) index, and
   wherein the second signaling field includes first information on resource allocation for transmission of the data to a plurality of STAs in an Orthogonal Frequency Division Multiple Access (OFDMA) scheme or a Multi-User MIMO (MU-MIMO) scheme; and
   a transceiver connected to the processor and configured to transmit the PPDU to the plurality of STAs,
   wherein the processor generates the first information to comprise common information included in a first field of the second signaling field and user specific information included in a second field of the second signaling field,
   wherein the processor generates the first field to include second information in a format of bitmap informing sizes of resource to be allocated to each of the plurality of STA,
   wherein the processor generates the second field to include third information used for allocating each of the resource, defined by the second information, to the plurality of STAs, and
   wherein different values of the bitmap of the second information inform different size-and-sequence combinations of the resource.

10. The AP according to claim 9, wherein the processor generates the third information to inform order combinations of the STAs to be allocated to the resource and to have a format of a permutation index informing the order combinations of the STAs.

* * * * *

UNITED STATES PATENT AND TRADEMARK OFFICE
CERTIFICATE OF CORRECTION

PATENT NO. : 10,448,367 B2  
APPLICATION NO. : 15/508819  
DATED : October 15, 2019  
INVENTOR(S) : Jeongki Kim et al.

Page 1 of 2

It is certified that error appears in the above-identified patent and that said Letters Patent is hereby corrected as shown below:

In the Claims

In Column 17, Lines 35-36:
Delete "format of bitmap informing sizes of resource to be allocated to each of the plurality of STA," and insert --format of bitmap informing each size of resource units to be allocated to each of the plurality of STAs,--

In Column 17, Lines 38-39:
Delete "for allocating each of the resource, defined by the second information, to the plurality of STAs, and" and insert --for allocating each of the resource units, defined by the second information, to each of the plurality of STAs, and--

In Column 17, Line 42:
Delete "nations of the resource." and insert --nations of the resource units.--

In Column 17, Line 45:
Delete "STAs to be allocated to the resource, and has a format of a" and insert --STAs to be allocated to the resource units, and has a format of a--

In Column 17, Line 49:
Delete "information informs the sizes of the resource in sequence by" and insert --information informs the sizes of the resource units in sequence by--

In Column 18, Lines 9-10:
Delete "STAs, and indicates each of the plurality of STAs is allocated a resource." and insert --STAs, and indicates each of the plurality of STAs allocated the resource units.--

In Column 18, Line 13:
Delete "STAs to be allocated resources by the second information" and insert --STAs to be allocated to the resource units by the second information--

Signed and Sealed this  
First Day of April, 2025

Coke Morgan Stewart  
*Acting Director of the United States Patent and Trademark Office*

CERTIFICATE OF CORRECTION (continued)
U.S. Pat. No. 10,448,367 B2

In Column 18, Lines 45-46:
Delete "sizes of resource to be allocated to each of the plurality of STA," and insert --each size of resource units to be allocated to each of the plurality of STAs,--

In Column 18, Line 49:
Delete "resource, defined by the second information, to the" and insert --resource units, defined by the second information, to each of the--

In Column 18, Line 53:
Delete "nations of the resource." and insert --nations of the resource units.--

In Column 18, Line 56:
Delete "of the STAs to be allocated to the resource and to have a" and insert --of the STAs to be allocated to the resource units and to have a--